United States Patent [19]

Sugita

[11] Patent Number: 5,543,974
[45] Date of Patent: Aug. 6, 1996

[54] IMAGE QUALITY ADJUSTING DEVICE WHICH DETECTS THE GRADE OF AN ENVELOPE OF AN FM LUMINANCE SIGNAL

[75] Inventor: Satoshi Sugita, Saijo, Japan

[73] Assignee: Matsushita Electric Industrial Co., Ltd., Osaka-fu, Japan

[21] Appl. No.: 95,047

[22] Filed: Jul. 22, 1993

Related U.S. Application Data

[63] Continuation of Ser. No. 707,002, May 29, 1991, abandoned.

[30] Foreign Application Priority Data

May 31, 1990 [JP] Japan .................. 2-143141

[51] Int. Cl.⁶ ........................................ H04N 5/78
[52] U.S. Cl. .................. 360/33.1; 360/25; 360/65; 360/67; 348/712
[58] Field of Search ..................... 360/65, 67, 27, 360/25, 33.1; 358/174, 175, 168, 315; 348/675, 645, 712

[56] References Cited

U.S. PATENT DOCUMENTS 4,075,661  2/1978  Heffron ...................... 348/625
4,396,953  8/1983  Fujita et al. ................. 358/328
4,700,239  10/1987 Yoshinaka et al. ........... 360/27 X
4,807,056  2/1989  Sasaki et al. ................. 360/27
5,068,718  11/1991 Iwabe et al. .................. 348/675
5,191,421  3/1993  Hwang ......................... 358/168
5,196,937  3/1993  Kageyama .................. 358/168 X
5,220,427  6/1993  Mikami ........................ 348/678
5,272,533  12/1993 Akiyama et al. ............. 348/607
5,299,002  3/1994  Funayama .................... 348/607

Primary Examiner—Andrew L. Sniezek
Attorney, Agent, or Firm—Wenderoth, Lind & Ponack

[57] ABSTRACT

An automatic image quality adjusting device for use in a video signal recording/reproducing apparatus includes a reproducing an head for reproducing FM signal from a magnetic recording medium, an envelop detecting unit for detecting an envelop of the FM signal, and grade detecting unit for detecting a grade of the envelop in accordance with an amplitude of the envelop. A frequency characteristics changing unit is provided for changing the frequency characteristics of a processing signal processed in stages between the reproducing head and a display unit in accordance with to the detected grade. Thus, the image quality is automatically adjusted by changing the frequency characteristics of processing signals in response to the detected grade of the envelope.

6 Claims, 3 Drawing Sheets

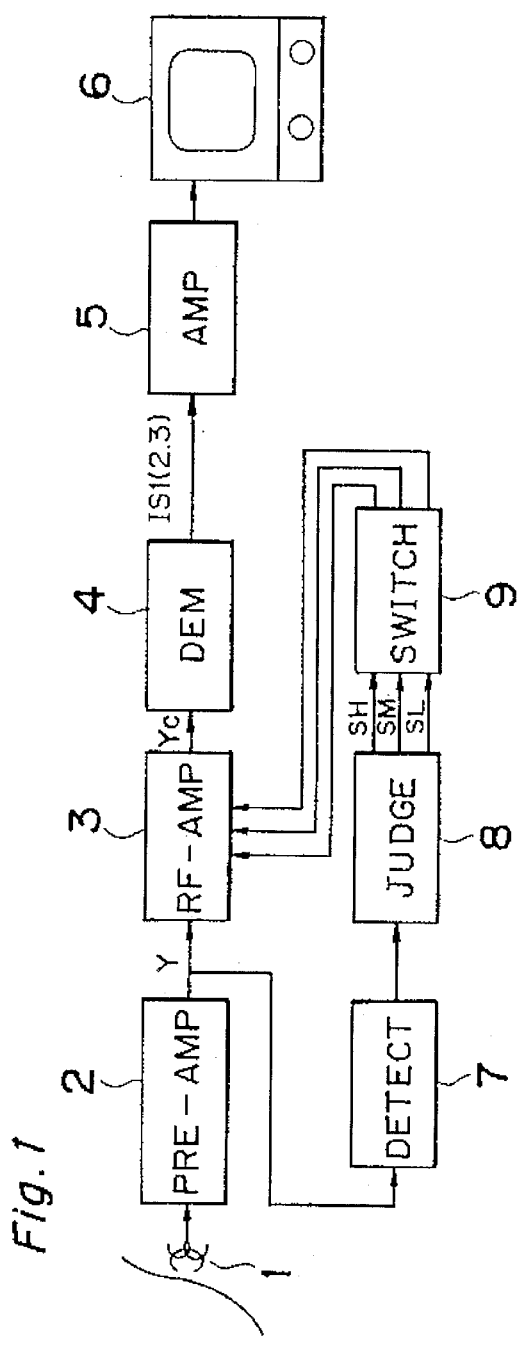
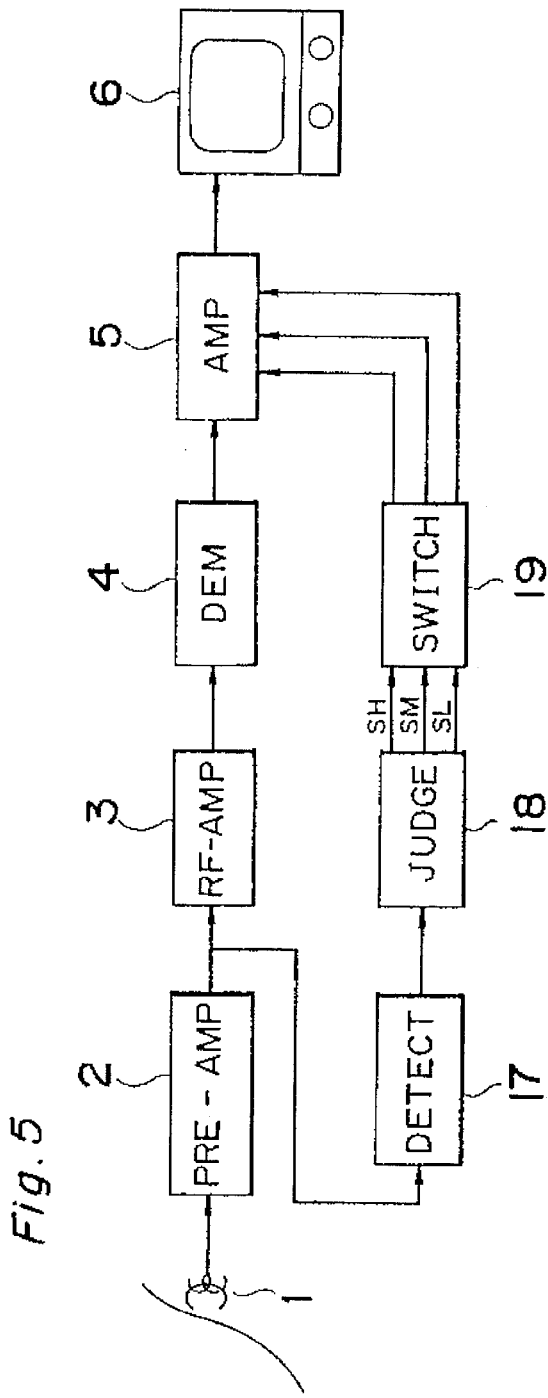

IMAGE QUALITY ADJUSTING DEVICE WHICH DETECTS THE GRADE OF AN ENVELOPE OF AN FM LUMINANCE SIGNAL

This application is a Continuation of now abandoned application, Ser. No. 07/707,002, filed May 29, 1991.

BACKGROUND OF THE INVENTION

1. Field of the Invention

The present invention relates to an automatic image quality adjusting device for a magnetic signal recording and reproducing apparatus and, more particularly, to an automatic image quality adjusting device which automatically varies the frequency characteristics in a reproduction process of image signals in accordance with the magnitude of an envelope of each video signal output from a reproduction head so that optimal image quality can automatically be achieved.

2. Description of the Prior Art

In order to vary a quality of a reproduced image, conventionally, an image quality adjusting device is provided for any of the magnetic signal recording and reproducing apparatuses to allow the user to optionally vary the image quality as the user desire's.

A typical example of a conventional image quality adjusting device is shown in FIG. 6. A video signal reproduced from a video tape by a video head 1 is initially amplified by a pre-amplifier 2, and then, the amplified video signals are divided into a frequency-modulated luminance signal Y and a color signal C of a low-level converted frequency. The frequency-modulated luminance signal Y is applied to an RF amplifier 3 which compensates the frequency of signal Y to produce a frequency compensated luminance signal Yc'. Then the frequency compensated luminance signal Yc' is demodulated and a demodulated luminance signal Yd' is produced by a demodulator 4. The demodulated luminance signal Yd' is then amplified by an amplifier 5 which then produces an amplified luminance signal Ya'. The amplified luminance signal Ya', thus obtained, is delivered to a television monitor 6, at which the user adjusts the image quality by manually operating a resistance controller R1 coupled to the amplifier 5 so that the frequency characteristic of the amplifier 5 is manually varied. Since video tapes from which the video signals are reproduced have different characteristics depending on the type of the tape used or the number of times the tape has been replayed, the luminance signal Ya' varies with respect to the tape. Thus, it is necessary for the user to adjust the luminance when there is a luminance change which may occur when the tape is changed, or within the same tape but at different portions.

SUMMARY OF THE INVENTION

The present invention has been developed with a view to substantially solving the above described disadvantages and has for its essential object to provide an improved image quality adjusting device.

In order to achieve the aforementioned objective, an automatic image quality adjusting device for use in a video signal recording/reproducing apparatus comprises a reproducing head for reproducing an FM signal from a magnetic recording medium, an envelop detecting means for detecting an envelop of the FM signal, a grade detecting means for detecting a grade of the envelop in accordance with an amplitude of the envelop, and a frequency characteristics changing means for changing the frequency characteristics of a processing signal processed in stages between the reproducing head and a display means in accordance with the detected grade.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which:

FIG. 1 is a block diagram of an automatic image quality adjusting device according to a first embodiment of the present invention;

FIG. 5 is a block diagram of an automatic image quality adjusting device according to a second embodiment of the present invention.

DETAILED DESCRIPTION OF THE PREFERRED EMBODIMENTS

Figure 6:
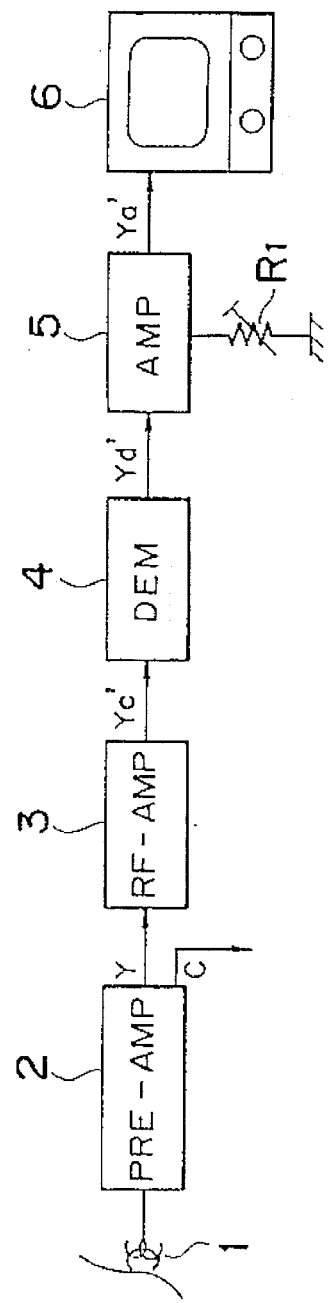
FIG. 6 is a block diagram of a conventional image quality adjusting device used for a magnetic signal recording and reproducing apparatus.

Referring to FIG. 1, an automatic image quality adjusting device according to a first embodiment of the present invention is shown. In FIG. 1, the circuits similar to those shown in FIG. 6 are designated by identical reference numerals.

When compared with the conventional image quality adjusting device of FIG. 1, the automatic image quality adjusting device according to the first embodiment of the present invention additionally comprises an envelope detecting unit 7 for detecting an envelope of the FM (frequency modulated) luminance signal Y which is reproduced by the head 1, a judging whether unit 8 for judging the grade of the detected envelope of the FM luminance signal Y is one of a high, medium, or low grade and for producing a grade signal SH, SM, or SL depending on the judged result, and a switching unit 9 for switching the frequency characteristics of the RF amplifier 3 in accordance with the grade signal SH, SM, or SL from the judging unit 8.

Figure 2:
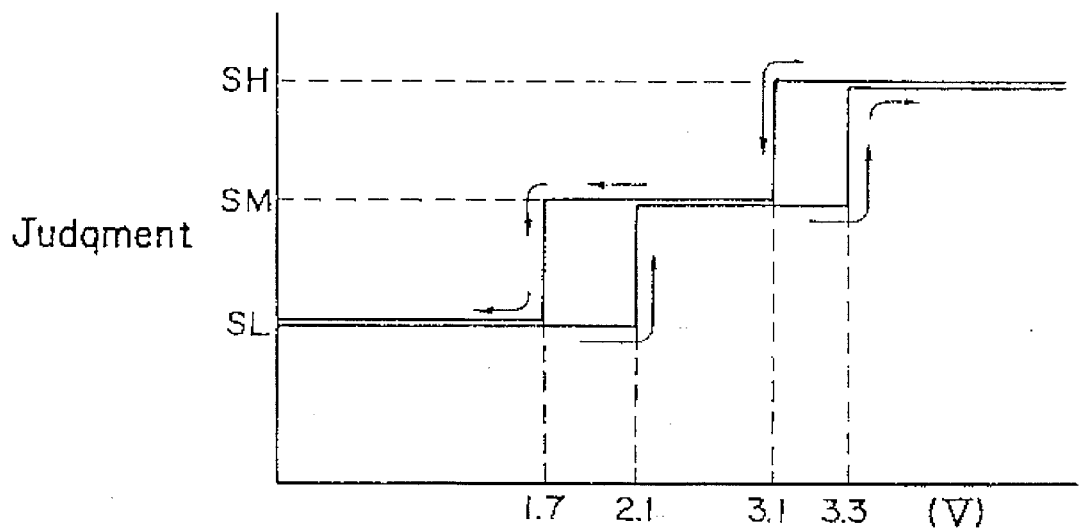
FIG. 2 is a graph showing a relationship between the electric potential of the envelope of a frequency modulated luminance signal and a grade signal representing the grade of the tape being used.

Referring to FIG. 2, the grade signals SH, SM, and SL which the judging unit 8 produces in accordance with the detected envelope level of the FM luminance signal Y is shown.

When the envelop level exceeds 2.1 volt during its increase, the judgement is changed from a "LOW GRADE" to a "MEDIUM GRADE". Similarly, when the envelop level exceeds 3.3 volts during its increase, the judgement is changed from a "MEDIUM GRADE" to a "HIGH GRADE". On the other hand, when the envelop level falls below 3.1 volts during its decrease, the judgement is changed from a "HIGH GRADE" to a "MEDIUM GRADE", and when the same falls below 1.7 volts during its decrease, the judgement is changed from a "MEDIUM GRADE" to "LOW GRADE". With respect to the three grades: "HIGH GRADE", "MEDIUM GRADE" and "LOW GRADE", the judging unit 8 produces grade signals SH, SM and SL, respectively.

As apparent from the above, the grades are changed using hysteresis characteristics to prevent frequent changes of the grade signal. The voltages at which the grades are changed are merely given as an example. Therefore, such voltages can be varied to any other voltages.

Based on the grade signal SH, SM or SL, the switching circuit 9 is activated to change the frequency characteristics of the RF amplifier 3.

Figure 3:
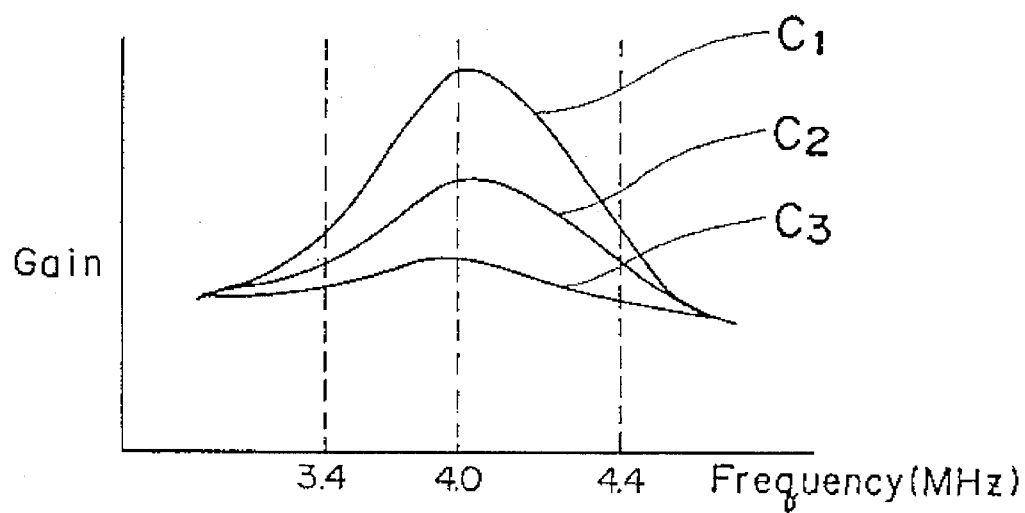
FIG. 3 is a graph showing an amplification characteristics curve of an RF amplifier shown in FIG. 1.

Referring to FIG. 3, the change in the frequency characteristics of the RF amplifier 3 relative to the grade signal is shown. When the grade signal SH is produced, the switching circuit 9 is switched to cause the RF amplifier 3 to have the frequency characteristics C3. Similarly, when the grade signal SM or SL is produced, the switching circuit 9 is switched to cause the RF amplifier 3 to have the frequency characteristics C2 or C1, respectively.

The RF amplifier 3 amplifies the FM luminance signal Y to produce a converted FM luminance signal Yc by using any of frequency characteristics C3, C2, and C1 adapted by the switching unit 9. As described above, when the envelope level of the signal Y is at "low grade" representing a low S/N ratio of the reproduced image, the signal Y is amplified by the frequency characteristics C1 with the biggest gain rate. When the signal Y is "high grade" representing a high S/N ratio of the reproduced image, the signal Y is amplified by the frequency characteristics C3 with the smallest gain rate. Thus, a converted FM signal Yc is obtained.

Figure 4:
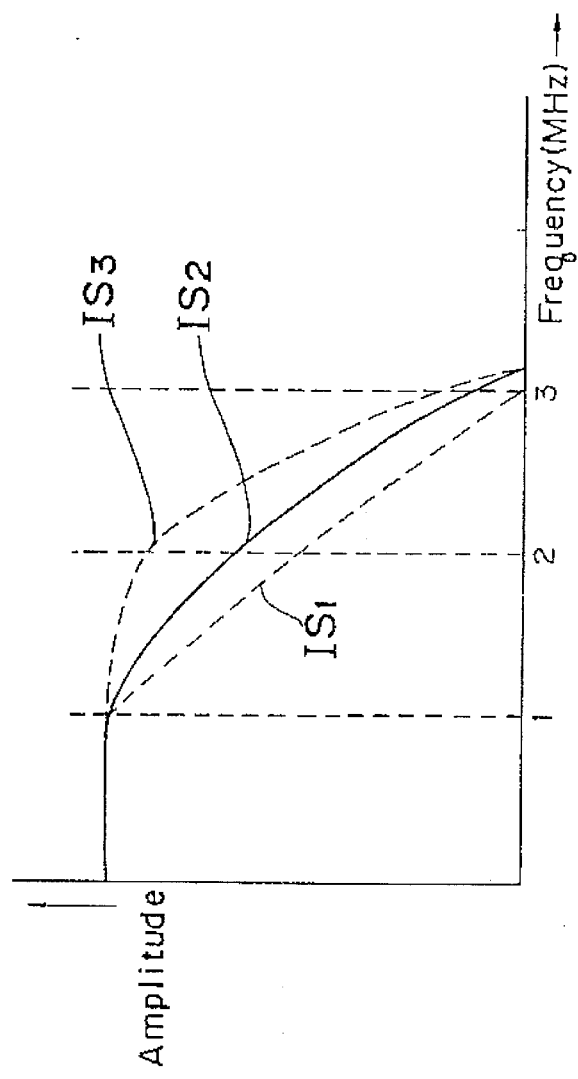
FIG. 4 is a graph showing frequency characteristics of the luminance signals obtained by the automatic image quality adjusting device of FIG. 1.

Referring to FIG. 4, the change of the frequency characteristics of the output of the demodulating unit 4, which is the video signal that has been demodulated from the amplified FM luminance signal Yc in three levels, is shown. In the graph, lines IS1, IS2, and IS3 represent three different situations. Line IS1 is obtained when the grade signal SL is produced, line IS2 is obtained when the grade signal SM is produced, and line LS3 is obtained when the grade signal SH is produced.

In order to reduce the amplitude of the high frequency band above 1 MHz of the demodulated video signal as in the case of line IS1, it is necessary to change the frequency characteristics of the RF amplifier 3 to reduce the gain at the side bands, relative to the other bands, in the FM luminance signal which corresponds to the demodulated video signal at a frequency band around 2 MHz where the amplitude is reduced.

On the other hand, in order to increase the amplitude of the high frequency band of the demodulated video signal as in the case of line IS3, it is necessary to change the frequency characteristics of the RF amplifier 3 to increase the gain at the side bands, relative to the other hands, in the FM luminance signal which corresponds to the demodulated video signal at a frequency band around 2 MHz.

According to the first embodiment shown in FIG. 1, the change of the frequency characteristics is accomplished in the RF amplifier 3 before the frequency demodulation. However, it is possible to change the frequency characteristics after the frequency demodulation, as shown in FIG. 5.

Referring to FIG. 5, a second embodiment of the automatic image quality control device is shown. In this embodiment, a switching circuit 19 is provided to change the frequency characteristics of a amplifier 5 in accordance with the grade signals SH, SM, and SL produced by a judging unit 18. Then, the image quality of the video signal is automatically controlled in a similar manner as in the first embodiment but after the demodulation of FM luminance signal.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An automatic image quality adjusting device for use in a video signal recording/reproducing apparatus comprising:
   a reproducing head for reproducing an FM luminance signal from a magnetic recording medium;
   an envelop detecting means for detecting an envelop of said FM luminance signal;
   a grade detecting means for detecting a grade of said envelop defined by a change in amplitude of said envelop, for generating a first grade signal when the detected grade is less than at least one predetermined first threshold value, for generating a second grade signal when the detected grade is more than said at least one predetermined first threshold value and less than at least one predetermined second threshold value which is greater than said at least one predetermined first threshold value, and for generating a third grade signal when the detected grade is greater than said at least one predetermined second threshold value; and
   a frequency characteristics changing means for changing the frequency characteristics of a processing signal obtained by processing said FM luminance signal in stages between the reproducing head and a display device in accordance with said first, second and third grade signals generated by said grade detecting means;
   wherein said frequency characteristics changing means includes means for selecting from among three predetermined frequency characteristic patterns to be applied to said processing signal, said three frequency characteristic patterns being selected in response to said first, second and third grade signals, respectively.

2. An automatic image quality adjusting device as claimed in claim 1, wherein said predetermined first and second threshold values define predetermined ranges, respectively.

3. An automatic image quality adjusting device for use in a video signal recording/reproducing apparatus comprising:
   a reproducing head for reproducing an FM luminance signal from a magnetic recording medium;
   an RF amplifying means for RF amplifying said FM luminance signal;
   a demodulator for demodulating said RF amplified signal;
   an amplifier for amplifying said demodulated signal;
   an envelop detecting means for detecting an envelop of said FM luminance signal;
   a grade detecting means for detecting a grade of said envelop defined by a change in amplitude of said envelop, for generating a first grade signal when the detected grade is less than at least one predetermined first threshold value, for generating a second grade signal when the detected grade is more than said at least one predetermined first threshold value and less than at least one predetermined second threshold value which is greater than said at least one predetermined first threshold value, and for generating a third grade signal when the detected grade is greater than said at least one predetermined second threshold value; and a frequency characteristics changing means for changing the frequency characteristics of a processing signal obtained by processing said FM luminance signal in stages between the reproducing head and said amplifier in accordance with said first, second and third grade signals generated by said grade detecting means;

wherein said frequency characteristics changing means includes means for selecting from among three predetermined frequency characteristic patterns to be applied to said processing signal, said three frequency characteristic patterns being selected in response to said first, second and third grade signals, respectively.

4. An automatic image quality adjusting device as claimed in claim 3, wherein said processing signal is a signal processed in said RF amplifier.

5. An automatic image quality adjusting device as claimed in claim 3, wherein said processing a signal is a signal processed in said amplifier.

6. An automatic image quality adjusting device as claimed in claim 3, wherein said predetermined first and second threshold values define predetermined ranges, respectively.

* * * * *